United States Patent [19]

Bowles et al.

[11] Patent Number: 4,693,727
[45] Date of Patent: Sep. 15, 1987

[54] PROCESS FOR DYEING SYNTHETIC POLYAMIDE MATERIALS WITH FIBRE-REACTIVE ANTHRAQUINONE DYES

[75] Inventors: James B. Bowles, Greensboro; Marshall White, Jr., High Point, both of N.C.; Alois Puentener, Rheinfelden, Switzerland; Jean-Marie Adam, Rosenau, France; Peter Loew, Muenchenstein, Switzerland

[73] Assignee: Ciba-Geigy Corporation, Ardsley, N.Y.

[21] Appl. No.: 841,064

[22] Filed: Mar. 18, 1986

Related U.S. Application Data

[63] Continuation-in-part of Ser. No. 669,548, Nov. 8, 1984, abandoned.

[51] Int. Cl.$^4$ .......................... D06P 1/38; D06P 3/24; C09B 67/26
[52] U.S. Cl. .......................................... 8/549; 8/499; 8/544; 8/643; 8/676; 8/677; 8/679; 8/680; 8/688; 8/924; 8/929
[58] Field of Search ................... 8/544, 549, 676, 543, 8/643, 679

[56] References Cited

U.S. PATENT DOCUMENTS

| | | | |
|---|---|---|---|
| 3,455,969 | 7/1969 | Schwander et al. | 8/676 |
| 3,538,127 | 11/1970 | Schwander | 8/676 |
| 3,538,128 | 11/1970 | Schwander et al. | 260/372 |
| 3,857,864 | 12/1974 | Schwander et al. | 8/676 |
| 3,862,192 | 1/1975 | Schwander et al. | 260/372 |
| 4,273,553 | 6/1981 | Harms et al. | 8/549 |
| 4,332,938 | 6/1982 | Harms et al. | 8/549 |
| 4,514,187 | 4/1985 | Schutz et al. | 8/531 |
| 4,652,269 | 3/1987 | Bowles et al. | 8/641 |

FOREIGN PATENT DOCUMENTS 3142852 5/1983 Fed. Rep. of Germany.
903590 8/1962 United Kingdom.
1009955 11/1965 United Kingdom.

OTHER PUBLICATIONS

The Chemistry of Synthetic Dyes, vol. VII, (1974) p. 93; 111., Physical Chemistry: State of Dye, D. Behavior of Dyes in Mixtures.

Primary Examiner—A. Lionel Clingman
Attorney, Agent, or Firm—Kevin T. Mansfield

[57] ABSTRACT

Process for preparing ozone-fast dyeings on synthetic polyamide fibre materials from aqueous liquor with anthraquinone dyes which comprises using at least one anthraquinone dye which contains one or two fibre-reactive groups and one or two sulfo groups.

The process according to the invention is suitable for dyeing synthetic polyamide materials producing with the monosulfoanthraquinone or disulfoanthraquinone dyes which contain one or two fibre-reactive groups level dyeings having good fastness properties, in particular good ozone fastness.

20 Claims, No Drawings

PROCESS FOR DYEING SYNTHETIC POLYAMIDE MATERIALS WITH FIBRE-REACTIVE ANTHRAQUINONE DYES

The present invention relates to a process for dyeing synthetic polyamide materials in ozone-fast shades with fibre-reactive sulfo-containing anthraquinone dyes.

It is repeatedly found that synthetic polyamide materials dyed with anthraquinone dyes do not meet present-day demands on the ozone fastness of dyeings.

It is the object of the present invention to provide a process for dyeing synthetic polyamide materials with anthraquinone dyes which produces dyeings of very good ozone fastness.

This object is achieved according to the invention with the process described hereinafter. The dyeings produced thereby meet the stated demands on ozone fastness.

The present invention accordingly provides a process for preparing ozone-fast dyeings on synthetic polyamide fibre materials from aqueous liquor with selected anthraquinone dyes which comprises using at least one anthraquinone dye which contains one or two fibre-reactive groups and one or two sulfo groups.

The process according to the invention produces dyeings on synthetic polyamide fibre materials of very good ozone fastness.

Suitable anthraquinone dyes are selected anthraquinone dyes having one or two fibre-reactive groups and one or two sulfo groups, for example the anthraquinone dyes given in the Colour Index as reactive blues.

In a preferred embodiment of the process according to the invention, a dye of the formula

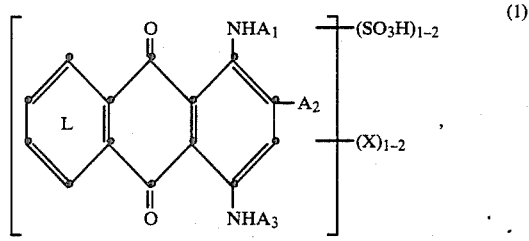

in which the ring L can be substituted by hydroxyl, halogen or sulfo, $A_1$ is hydrogen, $C_{1-8}$-alkyl, $C_{5-7}$-cycloalkyl, phenyl or phenyl-$C_{1-8}$-alkyl, $A_2$ is hydrogen or halogen, such as chlorine or bromine, or is preferably a sulfo group, $A_3$ is unsubstituted or $C_{1-4}$-alkyl-, $C_{1-4}$-alkoxy-, phenoxy-, $C_{1-4}$-alkylphenoxy-, or naphthoxy-substituted phenyl or phenyl-$C_{1-8}$-alkyl, and X is a fibre-reactive radical which is bonded either directly or via a bridge member, is used.

An alkyl radical $A_1$ in the formula (1) can be a straight-chain or branched alkyl radical, for example methyl, ethyl, propyl, isopropyl, butyl, sec.-butyl, isobutyl, tert.-butyl, pentyl, hexyl, heptyl or octyl.

A $C_{5-7}$-cycloalkyl radical $A_1$ can be for example an unsubstituted cyclohexyl radical or a cyclohexyl radical which is substituted by alkyl, such as methyl.

A phenyl radical $A_1$ in the formula (1) can be a phenyl radical which can be substituted by $C_{1-4}$-alkyl, $C_{1-4}$-alkoxy or halogen and can be further substituted by a sulfo group and a fibre-reactive radical; the phenyl radical is preferably substituted by a sulfo group and a fibre-reactive radical.

Phenyl-$C_{1-8}$-alkyl radicals $A_1$ and $A_3$ in the formula (1), independently of each other, can each be for example a benzyl, phenethyl, phenylbutyl or phenyl-sec.-butyl radical which is preferably substituted by a sulfo group and at least one fibre-reactive radical.

A phenyl radical $A_3$ in the formula (1) can be a phenyl radical which is substituted by $C_{1-4}$-alkyl, in particular methyl, $C_{1-4}$-alkoxy, in particular methoxy, phenoxy, $C_1$-$C_4$-alkylphenoxy, such as methylphenoxy or naphthoxy and which can be further substituted by a sulfo group and preferably one or two fibre-reactive radicals.

Fibre-reactive radicals X are to be understood as meaning radicals which are capable of reacting with the hydroxyl groups of cellulose, with the amino, carboxyl, hydroxyl and thiol groups of wool and silk, or with the amino and, where relevant, carboxyl groups of synthetic polyamides to form covalent chemical bonds.

X is preferably a fibre-reactive radical of the aliphatic, aromatic or heterocyclic series which is bonded to the radical $A_1$ and/or $A_3$ either directly or via a bridge member.

X is preferably bonded to the radical $A_1$ and/or $A_3$ either directly or via an amino group which can be monoalkylated, for example via —NH—, —N(CH$_3$)—, —N(C$_2$H$_5$)— or —N(C$_3$H$_7$)—, or via a bridge member containing an amino group.

A fibre-reactive radical X in the formula (1) can be for example one of the following aliphatic or aromatic radicals:

vinylsulfonyl, β-chloroethylsulfonyl, β-sulfatoethylsulfonyl, β-acetoxy-ethylsulfonyl, phosphonooxyethylsulfonyl, β-thiosulfatoethylsulfonyl, N-methyl-N-(β-sulfatoethylsulfonyl)-amino, acryloyl, monochloroacryloyl, dichloroacryloyl or trichloroacryloyl such as —CO—CCl=CH$_2$, —CO—CH=CH—Cl, —CO—CCl=CH—CH$_3$; monobromoacryloyl, dibromoacryloyl or tribromoacryloyl such as —CO—CBr=CH$_2$, —CO—CH=CH—Br, —CO—CBr=CH—CH$_3$; and also —CO—CCl=CH—COOH, —CO—CH=CCl—COOH, —CO—CBr=CH—COOH, —CO—CH=CBr—COOH, —CO—CCl=CCl—COOH, —CO—CBr=CBr—COOH; precursors of the acryloyl radical and of the derivatives of the acryloyl radical, such as β-chloropropionyl, β-bromopropionyl, 3-phenylsulfonylpropionyl, 3-methylsulfonylpropionyl, 3-chloro-3-phenylsulfonylpropionyl, 2,3-dichloropropionyl, 2,3-dibromopropionyl; and also 2-fluoro-2-chloro-3,3-difluorocyclobutane-1-carbonyl, 2,2,3,3-tetrafluorocyclobutane-1-carbonyl or -1-sulfonyl, β-(2,2,3,3-tetrafluorocyclobut-1-yl)-acryloyl, α- or β-alkylsulfonylacryloyl or arylsulfonylacryloyl groups such as α- or β-methylsulfonylacryloyl, propiolyl, chloroacetyl, bromoacetyl, 4-(β-chloroethylsulfonyl)-butyryl, 4-vinylsulfonyl-butyryl, 5-(β-chlorethylsulfonyl)-valeryl, 5-vinylsulfonyl-valeryl, 6-(β-chloroethylsulfonyl)-caproyl, 6-vinylsulfonyl-caproyl; and also 4-fluoro-3-nitrobenzoyl, 4-fluoro-3-nitrophenylsulfonyl, 4-fluoro-3-methylsulfonylbenzoyl, 4-fluoro-3-cyanobenzoyl, 2-fluoro-5-methylsulfonylbenzoyl.

The fibre-reactive radical X can also be a member of the heterocyclic series, for example a 2,4-dichlorotriazin-6-yl or monohalogenopyrimidinyl, dihalogenopyrimidinyl or trihalogenopyrimidinyl radical, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-monochloromethyl- or -5- dichloromethyl- or -5-trichloromethyl or -5-methylsulfonyl-pyrimidin-6-yl, 2,5-dichloro-4-methylsulfonyl-pyrimidin-6-yl, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbo-methoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; 2,4-bis-methylsulfonyl-pyrimidin-4-yl, 2,5-bis-methylsulfonyl-5-chloropyrimidin-4-yl, 2-methylsulfonyl-pyrimidin-4-yl, 2-phenylsulfonyl-pyrimidin-4-yl, 2-methylsulfonyl-5-chloro-6-methylpyrimidin-4-yl, 2-methylsulfonyl-5-bromo-6-methyl-pyrimidin-4-yl, 2-methylsulfonyl-5-chloro-6-ethyl-pyrimidin-4-yl, 2-methylsulfonyl-5-chloromethylpyrimidin-4-yl, 2-methylsulfonyl-5-nitro-6-methylpyrimidin-4-yl, 2,5,6-trismethylsulfonyl-pyrimidin-4-yl, 2-methylsulfonyl-5,6-dimethylpyrimidin-4-yl, 2-ethylsulfonyl-5-chloro-6-methyl-pyrimidin-4-yl, 2-methylsulfonyl-6-chloro-pyrimidin-4-yl, 2,6-bis-methylsulfonyl-5-chloro-pyrimidin-4-yl, 2-methylsulfonyl-6-carboxy-pyrimidin-4-yl, 2-methylsulfonyl-5-sulfo-pyrimidin-4-yl, 2-methylsulfonyl-6-carbomethoxypyrimidin-4-yl, 2-methylsulfonyl-5-carboxy-pyrimidin-4-yl, 2-methylsulfonyl-5-cyano-6-methoxy-pyrimidin-4-yl, 2-methylsulfonyl-5-chloro-pyrimidin-4-yl, 2-sulfoethylsulfonyl-6-methyl-pyrimidin-4-yl, 2-methylsulfonyl-5-bromo-pyrimidin-4-yl, 2-phenylsulfonyl-5-chloro-pyrimidin-4-yl, 2-carboxymethylsulfonyl-5-chloro-6-methyl-pyrimidin-4-yl, 2,4-dichloropyrimidine-6-carbonyl or -6-sulfonyl, 2,4-dichloropyrimidine-5-carbonyl or -5-sulfonyl, 2-chloro-4-methylpyrimidine-5-carbonyl, 2-methyl-4-chloropyrimidine-5-carbonyl, 2-methylthio 4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2,4-dichloro-6-methylpyrimidine-5-carbonyl or -5-sulfonyl, 2-methylsulfonyl-6-chloropyrimidine-4- and -5-carbonyl, 2,6-bis-(methylsulfonyl)-pyrimidine-4- or -5-carbonyl, 2-ethylsulfonyl-6-chloropyrimidine-5-carbonyl, 2,4-bis-(methylsulfonyl)-pyrimidine-5-sulfonyl, 2-methylsulfonyl-4-chloro-6-methylpyrimidine-5-sulfonyl or -5-carbonyl, 2chloroquinoxaline-3-carbonyl, 2- or 3-monochloroquinoxaline-6-carbonyl, 2- or 3-monochloroquinoxaline-6-sulfonyl, 2,3-dichloroquinoxaline-5 or -6-carbonyl, 2,3-dichloroquinoxaline-5- or -6-sulfonyl, 1,4-dichlorophthalazine-6-sulfonyl or -6-carbonyl, 2,4-dichloroquinazoline-7- or -6-sulfonyl or -carbonyl, 2,4,6-trichloroquinazoline-7- or -8-sulfonyl, 2- or 3- or 4-(4',5'-dichloropyridaz-6'-on-1'-yl)-phenylsulfonyl or -carbonyl, β-(4',5'-dichloropyridazin-6'-on-1'-yl)-propionyl, 3,6-dichloropyridazine-4-carbonyl or -4-sulfonyl, 2-chlorobenzothiazole-5-or -6-carbonyl or -5- or -6-sulfonyl, 2-arylsulfonyl-benzo-thiazole- or 2-alkylsulfonylbenzothiazole-5- or -6-carbonyl or -5- or -6-sulfonyl, such as 2-methylsulfonylbenzothiazole- or 2-ethylsulfonylbenzothiazole-5- or -6-sulfonyl or -carbonyl, 2-phenylsulfonylbenzothiazole-5- or -6-sulfonyl or -carbonyl and the corresponding 2-sulfonylbenzothiazole-5- or -6-carbonyl or -sulfonyl derivatives which contain sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methyl-1,3-thiazole-5-carbonyl or -4- or -5-sulfonyl; ammonium-containing triazine rings, such as 2-trimethylammonium-4-phenylamino- or -4-(o-, m- or p-sulfophenyl)-amino-triazin-6-yl, 2-(1,1-dimethylhydrazinium)-4-phenylamino- or -4-(o-, m- or p-sulfophenyl)-aminotriazin-6-yl, 2-(2-isopropylidene-1,1-dimethyl)-hydrazinium-4-phenylamino- or -4-(o-, m- or p-sulfophenyl)-amino-triazin-6-yl, 2-N-aminopyrrolidinium- or 2-N-aminopiperidinium-4phenylamino- or -4-(o-, m- or p-sulfophenyl)-amino-triazin-6-yl, and also 4-phenylamino- or 4-(sulfophenylamino)-triazin-6-yl radicals which, in the 2-position, contain 1,4-bis-azabicyclo[2.2.2]octane or 1,2-bis-azabicyclo[0.3.3]octane via a quaternary nitrogen bond, 2-pyridinium-4-phenylamino- or -4-(o-, m- or p-sulfophenyl)-amino-triazin-6-yl and corresponding 2-oniumtriazin-6-yl radicals which are substituted in the 4-position by alkylamino, such as methylamino, ethylamino or β-hydroxyethylamino, or alkoxy, such as methoxy or ethoxy, or aryloxy, such as phenoxy, or sulfophenoxy groups.

An interesting fibre-reactive radical can also be a chloro- or fluoro-1,3,5-triazine radical of the formula

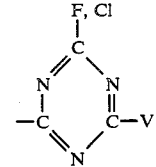

where the substituent V on the triazine ring can be in particular:

halogen, for example chlorine or fluorine, $C_{1-8}$-alkoxy, for example methoxy, cyclohexyloxy, phenoxy, $C_{1-6}$-alkylmercapto, such as methylmercapto, phenylmercapto, $-NH_2$, alkylamino, N,N-dialkylamino, cycloalkylamino, N,N-dicycloalkylamino, aralkylamino and arylamino groups, mixed-substituted amino groups, such as N-alkyl-N-cyclohexylamino and N-alkyl-N-arylamino groups, and also amino groups which contain heterocyclic radicals which can have further fused-on carbocyclic rings, and amino groups in which the amino nitrogen atom is a member of an N-heterocyclic ring which can contain further hetero atoms, as well as hydrazino and semicarbazido. The abovementioned alkyl radicals can be straight-chain or branched and of low molecular weight or higher molecular weight and are preferably alkyl radicals having 1 to 6 carbon atoms; cycloalkyl, aralkyl and aryl radicals can be in particular cyclohexyl, benzyl, phenethyl, phenyl and naphthyl radicals; heterocyclic radicals can be in particular furan, thiophene, pyrazole, pyridine, pyrimidine, quinoline, benzimidazole, benzoxazole radicals; and amino groups in which the amino nitrogen atom is a member of an N-heterocyclic ring are preferably radicals of six-membered N-heterocyclic compounds which can contain nitrogen, oxygen or sulfur as further hetero atoms. The abovementioned alkyl, cycloalkyl, aralkyl and aryl radicals, the heterocyclic radicals and the N-heterocyclic rings can be further substituted, for example by: halogen, such as fluorine, chlorine or bromine, nitro, cyano, trifluoromethyl, sulfamoyl, carbamoyl, $C_{1-4}$-alkyl, $C_{1-4}$-alkoxy, acylamino groups, such as acetylamino or benzoylamino, ureido, hydroxyl, carboxyl, sulfomethyl or sulfo. Examples of such amino groups are: —NH$_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloranilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3- or 4-carboxyphenylamino, 2-carboxy-5-sulfophenylamino, 2-carboxy-4-sulfophenylamino, 4-sulfonaphth-1-ylamino, 3,6-disulfonaphth-1-ylamino, 3,6,8-trisulfonaphth-1-ylamino, 4,6,8-trisulfonaphth-1-ylamino, 1-sulfonaphth-2-ylamino, 1,5-disulfonaphth-2-ylamino, 6-sulfonaphth-2-ylamino, morpholino, piperidino, piperazino, hydrazino and semicarbazido.

In particularly preferred embodiments of the process according to the invention, (a) a dye of the formula

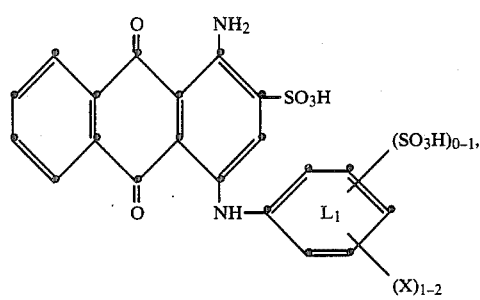

(2)

in which X is as defined under the formula (1) and the phenyl ring $L_1$ can be monosubstituted, disubstituted, trisubstituted or tetrasubstituted by $C_{1-4}$-alkyl, $C_{1-4}$-alkoxy or phenoxy, is used;

(b) a dye of the formula

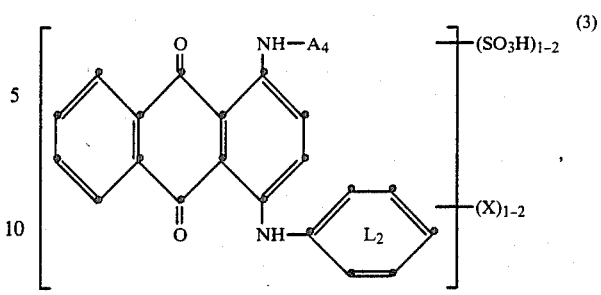

(3)

in which $A_4$ is a $C_{1-6}$-alkyl or $C_{5-7}$-cycloalkyl radical, X is as defined under the formula (1) and the phenyl ring $L_2$ can be monosubstituted, disubstituted or trisubstituted by $C_{1-4}$-alkyl, $C_{1-4}$-alkoxy, phenoxy or $C_{1-4}$-alkylphenoxy, is used;

(c) a dye of the formula

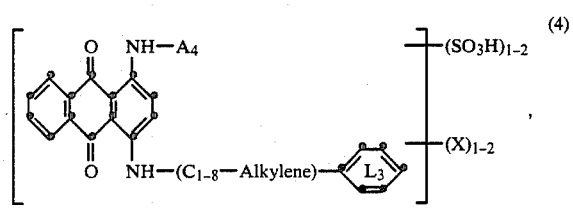

(4)

in which $A_4$ is as defined under the formula (3), X is as defined under the formula (1) and the phenyl ring $L_3$ can be monosubstituted or disubstituted by $C_{1-4}$-alkyl or $C_{1-4}$-alkoxy, is used;

(d) a dye of the formula

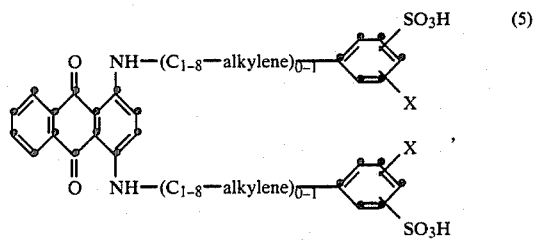

(5)

in which X is as defined under the formula (1), is used.

In very particularly preferred embodiments of the process according to the invention (e) a dye of the formula (2) or (3) is used;

(f) use is made of anthraquinone dyes of the type defined by the invention in which X is a fibre-reactive radical of the aliphatic, aromatic or heterocyclic series which can be bonded via a bridge member of the formula

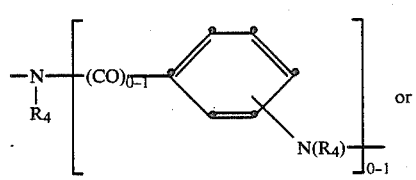

via 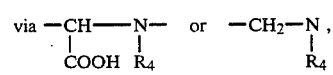

and $R_4$ is hydrogen or $C_{1-4}$-alkyl;

(g) use is made of anthraquinone dyes of the type defined by the invention in which X is a chloroacetyl, bromoacetyl, acryloyl, α,β-dichloropropionyl, α,β-dibromopropionyl, α-bromoacryloyl or α-chloroacryloyl radical which is bonded via —NH—,

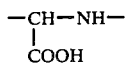

or —CH₂—NH— or is a radical of the formula

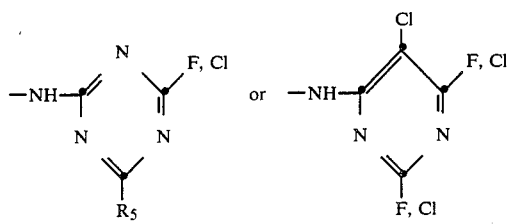

in which $R_5$ is $C_{1-6}$-alkoxy, $C_{1-6}$-alkylmercapto or a radical of the formula

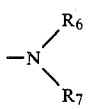

where $R_6$ and $R_7$, independently of each other, are each hydrogen, $C_{1-6}$-alkyl or substituted or unsubstituted phenyl or naphthyl, or is a vinylsulfonyl, β-sulfatoethylsulfonyl, β-acetoxyethylsulfonyl, β-chloroethylsulfonyl or β-(β'-sulfatoethylsulfonyl)-propionylaminomethyl radical.

In three particularly interesting embodiments of the process according to the invention, use is made of (h) an anthraquinone dye of the formula

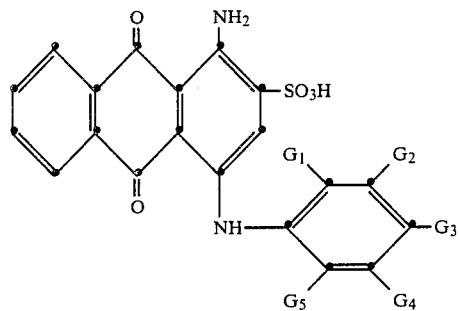

(6)

in which $G_1$, $G_3$ and $G_5$ are each methyl, $G_4$ is α,β-dibromopropionylaminomethyl, α-chloroacryloylaminomethyl, α-bromoacryloylaminomethyl, β-(β'-sulfatoethylsulfonyl)-propionylaminomethyl, α,β-dibromopropionylamino,

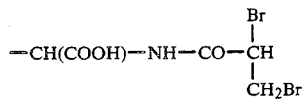

or chloroacetylaminomethyl and $G_2$ is hydrogen, sulfo, chloroacetylaminomethyl or —CH(COOH)—NH—CO—CHBr—CH₂Br or in which $G_1$ is hydrogen or methoxy, $G_2$, $G_3$ and $G_5$ are each hydrogen and $G_4$ is sulfatoethylsulfonyl, chloroacetylamino, α,β-dibromopropionylamino, vinylsulfonyl, 2-methoxy-4-fluoro-s-triazinylamino or 2-ehtylamino-4-fluoro-s-trizinylamino or in which $G_1$, $G_2$, $G_4$ and $G_5$ are each hydrogen and $G_3$ is chloroacetylamino, α,β-dibromopropionylamino, 2,6-difluoro-5-chloro-pyrimidin-4-ylamino or 2-chloro-4-amino- or 4-N,N-dimethyl-amino-s-triazinylamino, or in which $G_1$ is methyl, $G_2$ is β-sulfatoethylsulfonyl and $G_3$, $G_4$ and $G_5$ are each hydrogen, or in which $G_1$ or $G_2$ is sulfo, $G_3$ is α-bromoacryloylamino or N-methyl-N-[3-β-chloroethylsulfonyl)-benzoyl]-amino and $G_2$ or $G_1$ and $G_4$ and $G_5$ are each hydrogen, or $G_1$, $G_2$ and $G_5$ are each hydrogen, $G_3$ is methyl and $G_4$ is chloroacetylamino, or in which $G_1$ is methyl, $G_2$ is 2,6-difluoro-5-chloropyrimidinylamino, $G_4$ is sulfo and $G_3$ and $G_5$ are each hydrogen;

(i) a dye of the formula (6) in which $G_1$, $G_2$, $G_4$ and $G_5$ are each hydrogen and $G_3$ is chloroacetylamino or α,β-dibromopropionylamino, or in which $G_1$, $G_2$, $G_3$ and $G_5$ are each hydrogen and $G_4$ is vinylsulfonyl, chloroacetylamino, 2-methoxy- or 2-ethylamino-4-fluoro-s-triazinylamino or in which $G_1$, $G_3$ and $G_5$ are each methyl, $G_2$ is hydrogen and $G_4$ is chloroacetylaminomethyl, α,β-dibromopropionylaminomethyl or —CH(COOH)—NH—CO—CHBr—CH₂Br, or in which $G_1$ is methoxy, $G_2$, $G_3$ and $G_5$ are each hydrogen and $G_4$ is β-sulfatoethylsulfonyl, or in which $G_1$, $G_3$ and $G_5$ are each hydrogen and $G_2$ and $G_4$ are each chloroacetylaminomethyl or —CH(COOH)—NH—CO—CHBr—CH₂Br, or in which $G_1$, $G_3$ and $G_5$ are each methyl, $G_2$ is α,β-dibromopropionylamino and $G_4$ is sulfo, or in which $G_1$ is sulfo, $G_2$, $G_4$ and $G_5$ are each hydrogen and $G_3$ is α-bromoacryloylamino, or in which $G_1$ is methyl, $G_2$ is 2,6-difluoro-5-chloropyrimidylamino, $G_3$ and $G_5$ are each hydrogen and $G_4$ is sulfo; and (j) an anthraquinone dye of the formula (1) in which $A_1$ is cyclohexyl, $A_2$ is hydrogen, $A_3$ is 4-(4'-methylphenoxy)-phenyl and X is chloroacetylaminomethyl and the dye contains only one sulfo group or in which $A_1$ is isopropyl, $A_2$ is hydrogen and $A_3$, together with X, is a phenyl-sec.-butyl radical which is substituted in the phenyl ring by sulfo and chloroacetylaminomethyl or is a 4-phenoxyphenyl radical which is substituted in the phenoxy radical by sulfo and acryloylaminomethyl, or in which $A_2$ is hydrogen and $A_1$ and $A_3$, together with X, are both a 4-α-bromoacryloylamino-3-sulfophenyl radical or a phenyl-sec.-butyl radical which is substituted in the phenyl ring by sulfo and chloroacetylaminomethyl.

Of the dyes indicated in (j), preference is given to the dye of the formula (1) in which $A_1$ is cyclohexyl, $A_2$ is hydrogen and $A_3$ is 4-(4'-methylphenoxy)-phenyl, the phenyl ring of the phenoxy group being substituted by sulfo and chloroacetylaminomethyl.

A particularly important embodiment of the process according to the invention comprises using a dye of the formula (6) in which $G_1$, $G_2$, $G_4$ and $G_5$ are each hydrogen and $G_3$ is α,β-dibromopropionylamino, or in which $G_1$, $G_3$, $G_4$ and $G_5$ are each hydrogen and $G_2$ is vinylsulfonyl, chloroacetylamino, 2-methoxy-4-fluoro-s-triazinylamino or 2-ethylamino-4-fluoro-s-triazinylamino, or in which $G_1$ is methyl, $G_2$ is 2,6-difluoro-5-chloropyrimidinylamino, $G_3$ and $G_5$ are both hydrogen and $G_4$ is sulfo, or in which $G_1$ is methoxy, $G_2$, $G_3$ and $G_5$ are each hydrogen and $G_4$ is β-sulfatoethylsulfonyl, or in which $G_1$, $G_3$ and $G_5$ are each methyl, $G_2$ is hydrogen or —CH(COOH)—N-

H—CO—CHBr—CH$_2$Br and G$_4$ is $\alpha,\beta$-dibromopropionylaminomethyl or —CH(COOH)—NH—CO—CHBr—CH$_2$Br, or in which G$_1$, G$_3$ and G$_5$ are each methyl, G$_2$ is $\alpha,\beta$-dibromopropionylamino and G$_4$ is sulfo, or in which G$_1$ is sulfo, G$_2$, G$_4$ and G$_5$ are each hydrogen and G$_3$ is $\alpha$-bromoacryloylamino.

Very particularly important embodiments of the process according to the invention comprise using the dye of the formula

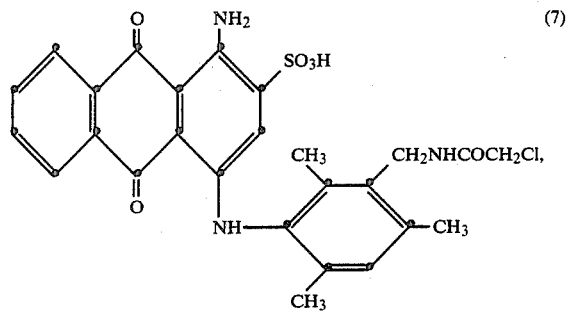

or the dye of the formula

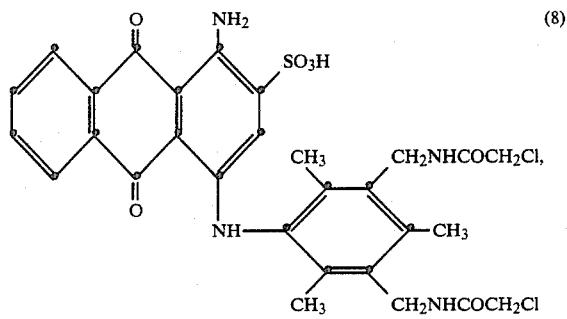

or the dye of the formula

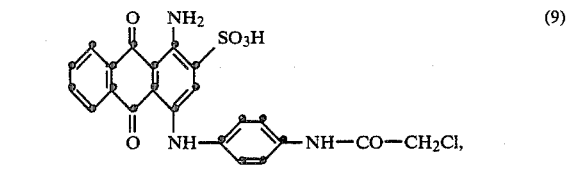

or the dye of the formula

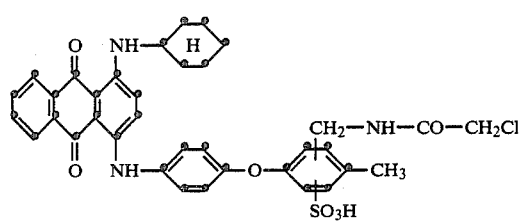

In the process according to the invention, it is also possible to use mixtures of two or more anthraquinone dyes of the type defined. In particular, use is made of a mixture of two anthraquinone dyes whose individual components each contain one or two fibre-reactive groups and one or two sulfo groups.

Preferably, each individual component of the mixture corresponds to one of the anthraquinone dyes specified above under the formula (1).

It is very particularly preferred to use in the process according to the invention mixtures of anthraquinone dyes of the formulae (2), (3), (4) or (5), i.e. mixtures in which one component corresponds to a dye of the formula (2), (3), (4) or (5) and the other component corresponds to a dye of the formula (2), (3), (4) or (5). In particular, use is made of a mixture of two anthraquinone dyes in which one component corresponds to a dye of the formula (2) and the other component corresponds to a dye of the formula (2) or (3).

In an important mixture of anthraquinone dyes which can be used in the process according to the invention, one component corresponds to a dye of the formula (7), (8) or a dye of the formula (3) in which A$_4$ is cyclohexyl, L$_2$ is substituted by p-methylphenoxy and X is chloroacetylaminomethyl, and the dye of the formula (3) contains only one sulfo group, and the other component corresponds to a dye of the formula (6) in which G$_1$, G$_2$, G$_4$ and G$_5$ are each hydrogen and G$_3$ is $\alpha,\beta$-dibromopropionylamino, or in which G$_1$, G$_3$, G$_4$ and G$_5$ are each hydrogen and G$_2$ is vinylsulfonyl, chloroacetylamino, 2-methoxy-4-fluoro-s-triazinylamino or 2-ethylamino-4-fluoro-s-triazinylamino, or in which G$_1$ is methyl, and G$_2$ is 2,6-difluoro-5-chloropyrimidinylamino, G$_3$ and G$_5$ are both hydrogen and G$_4$ is sulfo, or in which G$_1$ is sulfo, G$_2$, G$_4$ and G$_5$ are each hydrogen and G$_3$ is $\alpha$-bromoacryloylamino, or in which G$_1$, G$_3$ and G$_5$ are each methyl, and G$_2$ is $\alpha,\oplus$-dibromopropionylaminomethyl, —CH(COOH)—NH—CO—CHBr—CH$_2$Br or $\alpha,\beta$-dibromopropionylamino and G$_4$ is hydrogen, —CH(COOH)—NH—CO—CHBr—CH$_2$Br or sulfo, or in which G$_1$ is methoxy, G$_2$, G$_3$ and G$_5$ are each hydrogen and G$_4$ is $\beta$-sulfatoethylsulfonyl.

In a particularly important mixture of anthraquinone dyes which can be used in the process according to the invention, one component corresponds to the dye of the formula (7) or (8) and the other component corresponds to the dye of the formula (3) in which A$_4$ is cyclohexyl, L$_2$ is substituted by p-methylphenoxy and X is chloroacetylaminomethyl and the dye of the formula (3) contains only one sulfo group.

In a further particularly important mixture of anthraquinone dyes which can be used in the process according to the invention, one component corresponds to the dye of the formula (7) or (8) and the other component corresponds to the dye of the formula (6) in which G$_1$, G$_2$, G$_4$ and G$_5$ are each hydrogen and G$_3$ is chloroacetylamino.

In a very particularly important mixture of anthraquinone dyes which can be used in the process according to the invention, one component corresponds to the dye of the formula (8) and the other component corresponds to the dye of the formula (10). Preferably the weight ratio of the dyes of the formulae (8) to (10) is 90:10 to 70:30, in particular 80:20.

In general the weight ratio of the anthraquinone dyes in the mixtures used according to the invention can vary within wide limits. A weight ratio of 90:10 to 10:90 and in particular to 70:30 to 30:70, has been found to be advantageous.

The anthraquinone dyes of the formula (1) or the components of the mixtures used in the process according to the invention preferably contain only one sulfo group.

The anthraquinone dyes used in the process according to the invention are known per se or can be prepared analogously to known methods. For instance, the dyes of the formula (1) can be prepared as indicated in German Offenlegungsschrift No. 2,305,206, Swiss Pat. No. 466,470 and British Pat. No. 903,590.

The dyes used in the process according to the invention are either in the form of their free sulfonic acid or preferably in the form of its salts.

Examples of suitable salts are the alkali metal, alkaline earth metal and ammonium salts and the salts of organic amines. Examples are the sodium, lithium, potassium and ammonium salts and the salt of triethanolamine.

The dyes used in the process according to the invention generally contain further additives, such as sodium chloride or dextrin.

The process according to the invention for dyeing synthetic polyamide materials can be applied to the customary dyeing methods.

The dyeing liquors, in addition to water and the dyes, can contain further additives, for example wetting agents, anti-foams, levelling agents or agents which affect the nature of the textile material, for example softeners, fire retardants or soil-, water- or oil-repellent agents, and water-softening agents and natural or synthetic thickeners, for example alginates or cellulose ethers.

The process according to the invention is particularly suitable for continuous dyeing.

The dyes used in the process according to the invention are distinguished by uniform build-up, good exhaustion properties and good fastness properties, in particular good ozone fastness.

The particularly noteworthy ozone fastness of the dyeings obtained with the process according to the invention on synthetic polyamide materials is determined by American Association of Textile Chemists and Colorists test methods 109-1975 and 129-1975.

The process according to the invention is suitable for dyeing synthetic polyamide materials, for example nylon or Perlon, in particular nylon 6.6 and preferably nylon 6.

Said textile material can be dyed at various stages in processing, for example as fibre, yarn, woven fabric or knitted fabric and in particular as carpet.

In a particularly interesting embodiment of the process according to the invention, nylon carpets are continuously dyed with anthraquinone dyes of the formula (1) or mixtures of anthraquinone dyes of the formula (1), in particular the anthraquinone dyes of the formulae (2) or (6).

If mixtures of dyes are used in the process according to the invention, these can be prepared by mixing the individual dyes. This mixing process is effected for example in suitable mills, for example ball and pin mills, and kneaders or mixers.

The mixtures of dyes can also be prepared by spray-drying the aqueous mixtures of dyes.

The amounts in which the dyes or mixtures are used in the dyebaths can vary within wide limits, depending on the desired depth of shade, but in general amounts of 0.001 to 6% by weight of fibre has been found to be advantageous.

The liquor ratio can be chosen from within a wide range, from 1:1 to 5:1 for continuous dyeing methods and from 5:1 to 50:1, preferably 8:1 to 25:1, for discontinuous exhaust methods.

Dyeing is effected from aqueous liquor, for example by the exhaust method, for example at temperatures between 70° and 130° C., preferably at around the boil, i.e. at 95 to 105° C., or in the case of continuous dyeing methods at temperatures between 60° and 98° C. In continuous methods, the liquor padded or sprayed on the cloth is preferably hot.

The pH of the dyeing liquor can vary within the range from 5 to 9. In general, a pH of 6 to 8.5 has been found to be advantageous. In the process according to the invention it can be advantageous to vary the pH during the dyeing, in particular to start the dyeing at a pH of 9 and to bring the dyeing liquor to pH 5 in the course of the dyeing.

The dye time for discontinuous exhaust methods is generally 10 to 50 minutes. With continuous methods, the dye time depends on the dyeing apparatus or machines used.

In the following examples, parts are by weight. The temperatures are given in degrees centigrade. Parts by weight relate to parts by volume as the gramme relates to the cubic centimeter.

EXAMPLE 1

10 parts of nylon 6 carpet yarn [Allied 3B-39] are introduced at 40° into a dyebath which contains 500 parts of water, 1 part of $NaH_2PO_4$, 0.15 part of $Na_2HPO_4$ and 0.02 part of the dye of the formula

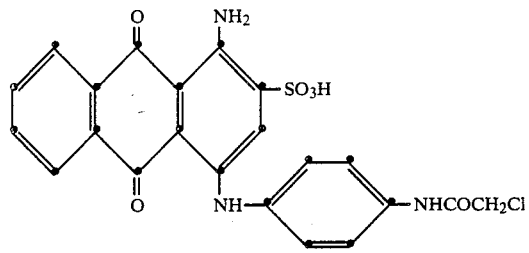

The temperature is uniformly raised to the boil in the course of 30 minutes, and dyeing is continued at that temperature for 1 hour. The blue-dyed yarn is then rinsed and dried.

The ozone fastness of the dyeing obtained is tested in accordance with AATCC [American Association of Textile Chemists and Colorists] test method 129-1975, and the colour change is evaluated against the standard grey scale [SNV (Swiss Standards Institute) standard 95805] where 1 is worst and 5 is best.

The dyeing obtained with the above dye has a fastness level of 4–5.

Replacing the dye given in the above example by one of the dyes indicated in column II of the following table or by one of the dye mixtures indicated likewise affords blue dyeings having the fastness levels indicated in column III of the table for the colour change after said ozone fastness test.

| Example I | Dye of the formula II | Fastness Level III |
|---|---|---|
| 2 | 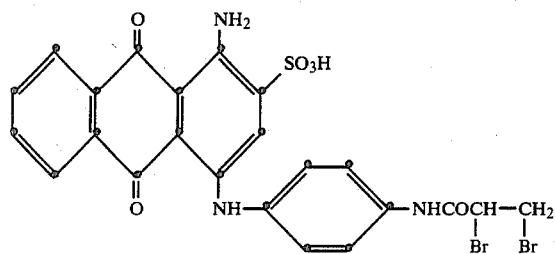 | 4 |
| 3 | 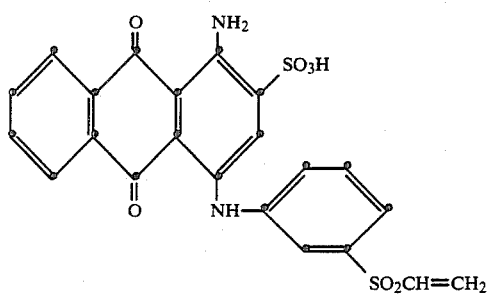 | 5 |
| 4 | 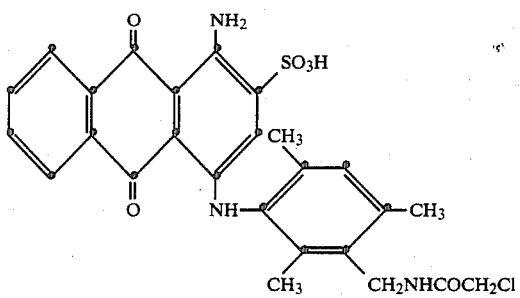 | 4 |
| 5 | 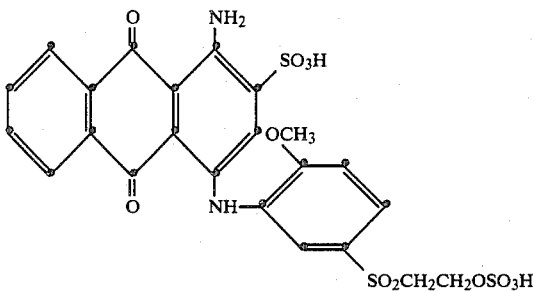 | 4 |
| 6 | 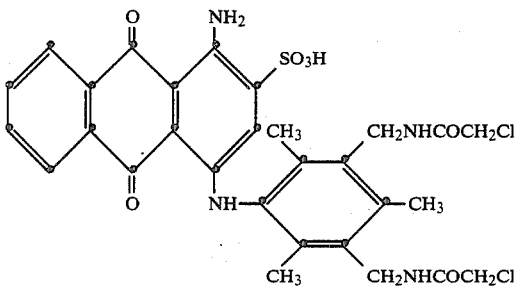 | 4 |

-continued
| Example 1 | Dye of the formula II | Fastness Level III |
|---|---|---|
| 7 | 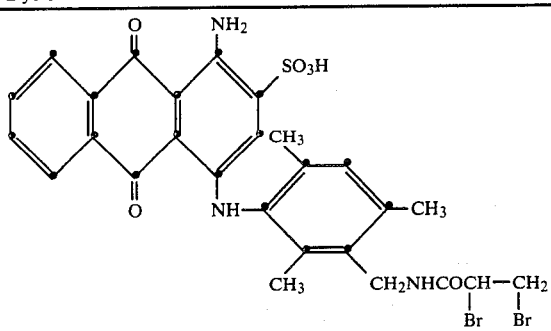 | 4 |
| 8 | 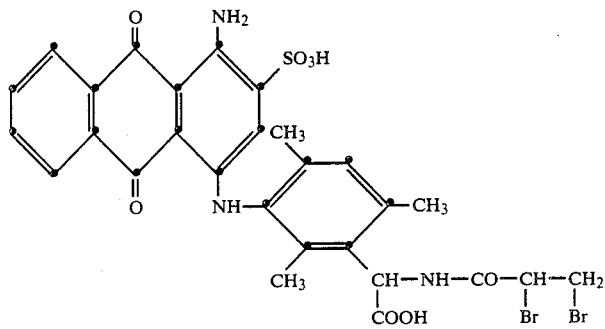 | 4 |
| 9 | 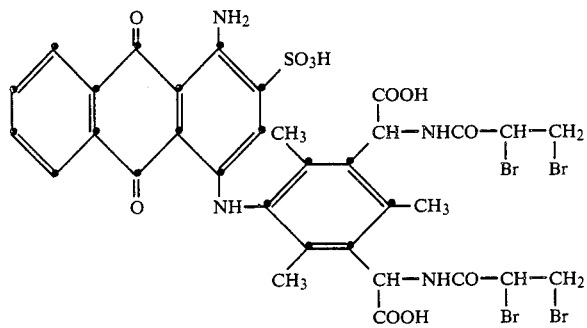 | 4 |
| 10 | Mixture of 80 parts by weight of the dye of the formula 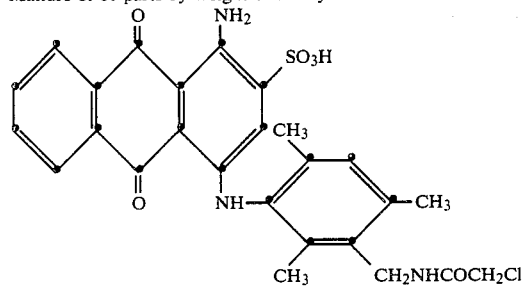 and 20 parts by weight of the dye of the formula 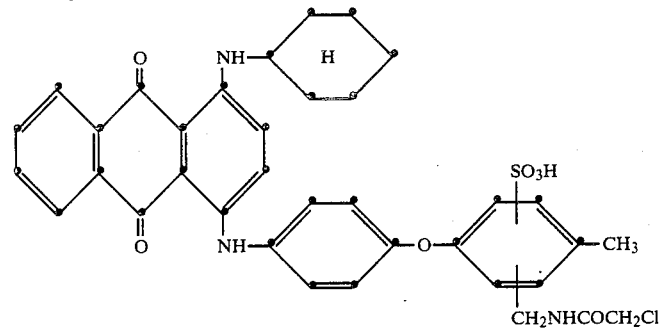 | 4 |

| Example I | Dye of the formula II | Fastness Level III |
|---|---|---|
| 11 | Mixture of 80 parts by weight of the dye of the formula 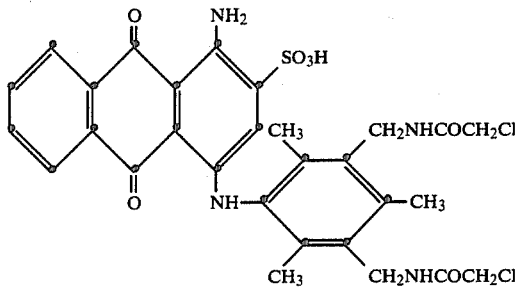 and 20 parts by weight of the dye of the formula 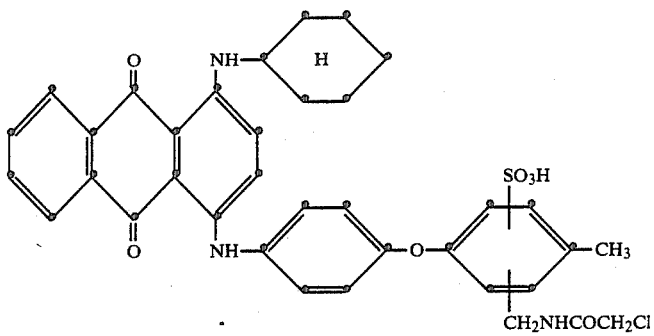 | 4 |
| 12 | Mixture of 90 parts by weight of the dye of the formula 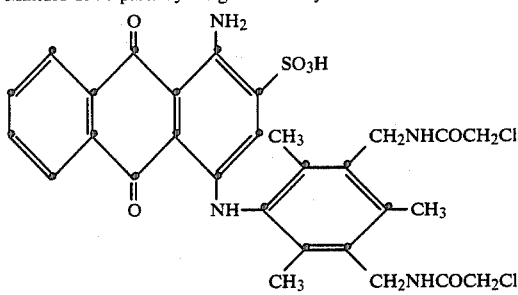 and 10 parts by weight of the dye of the formula 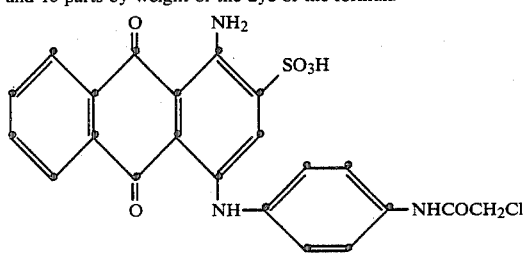 | 4 |
| 13 | Mixture of 50 parts by weight of the dye of the formula 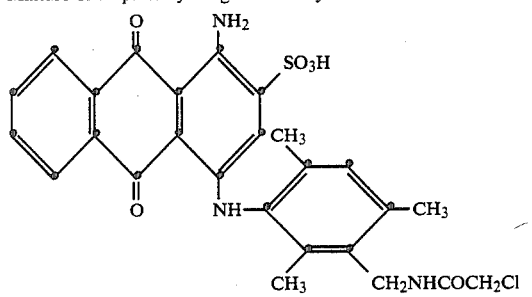 and 50 parts by weight of the dye of the formula | 4 |

| Example I | Dye of the formula II | Fastness Level III |
|---|---|---|
| | 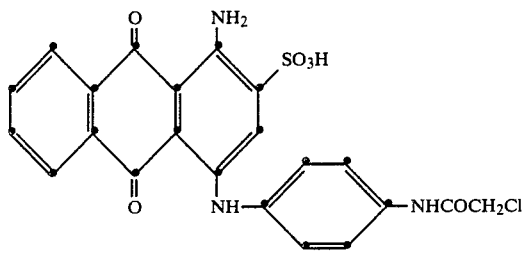 | |
| 14 | Mixture of 80 parts by weight of the dye of the formula<br>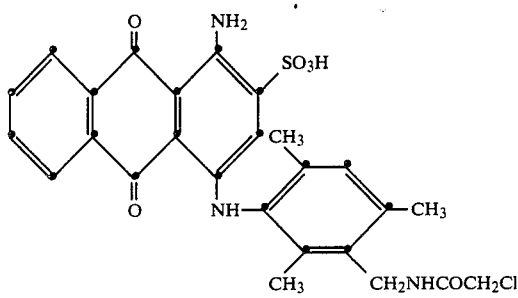<br>and 20 parts by weight of the dye of the formula<br>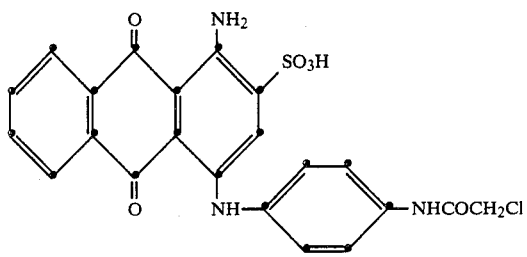 | 4 |
| 15 | 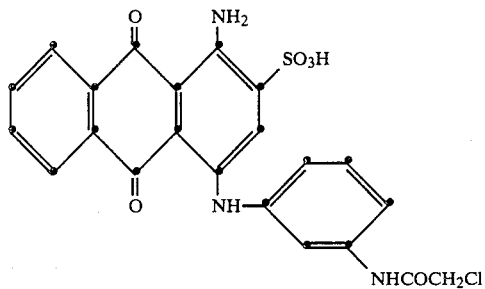 | 4 |
| 16 | 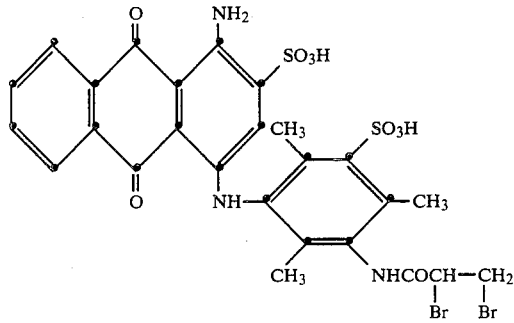 | 4 |

-continued
| Example I | Dye of the formula II | Fastness Level III |
|---|---|---|
| 17 | 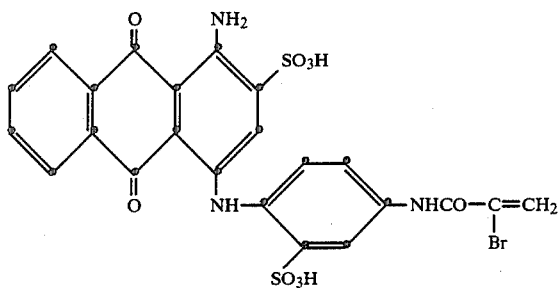 | 4 |
| 18 | 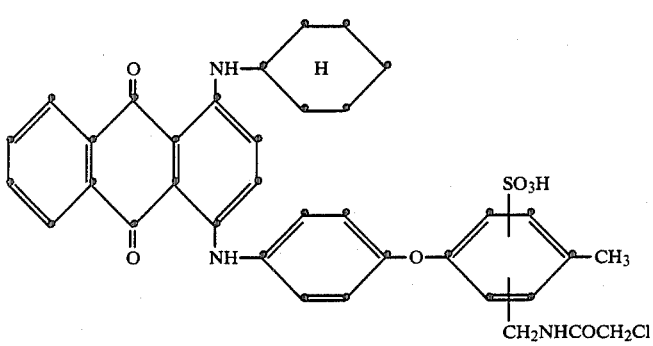 | 3-4 |
| 19 | 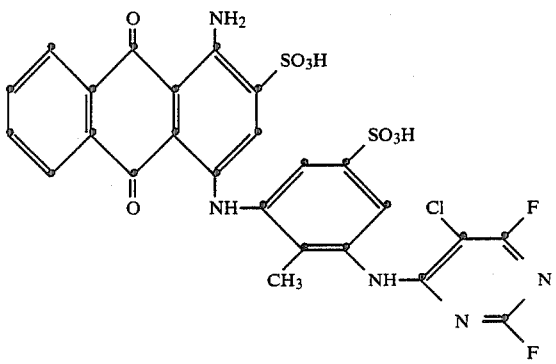 | 4 |
| 20 | 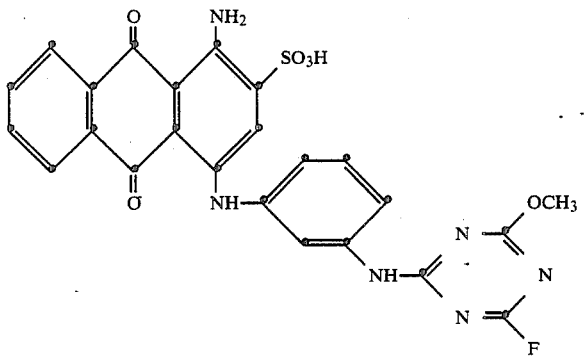 | 4 |

| Example I | Dye of the formula II | Fastness Level III |
|---|---|---|
| 21 | 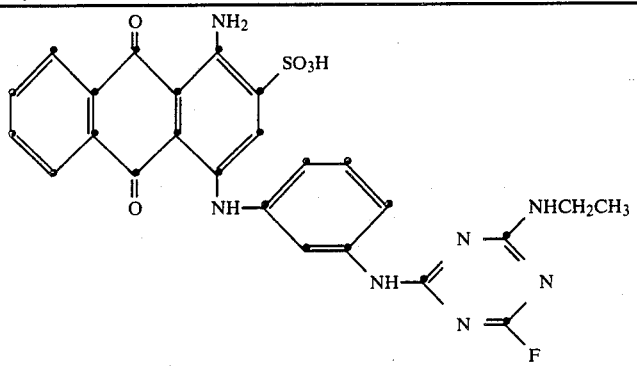 | 4 |

COMPARATIVE EXAMPLE

Replacing the 0.02 part of the dye in Example 1 by 0.02 part of the non-fibre-reactive dye of the formula

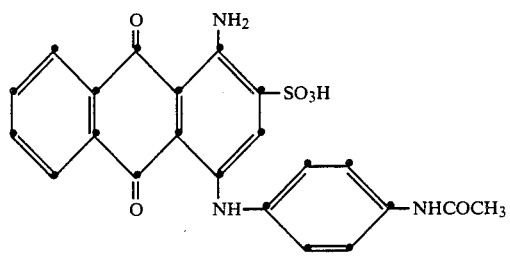

produces a blue dyeing which, on testing in accordance with the AATCC ozone fastness test method 129-1975, has a fastness level in terms of colour change [SNV standard 95805] of only 2-3.

We claim:

1. A continuous process for preparing ozone-fast dyeings on synthetic polyamide fiber material from aqueous liquor with anthraquinone dyes which comprises applying to said fiber material from said liquor at least one anthraquinone dye of the formula

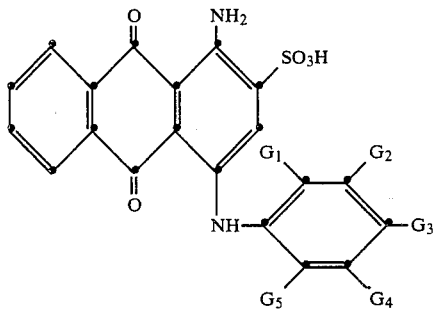

in which $G_1$, $G_2$, $G_4$ and $G_5$ are each hydrogen and $G_3$ is a $\alpha,\beta$-dibromopropionylamino, or in which $G_1$, $G_3$, $G_4$ and $G_5$ are each hydrogen and $G_2$ is vinylsulfonyl, chloroacetylamino, 2-methoxy-4-fluoro-s-triazinylamino or 2-ethylamino-4-fluoro-s-triazinylamino, or in which $G_1$ is methyl, $G_2$ is 2,6-difluoro-5-chloropyrimidinylamino, $G_3$ and $G_5$ are both hydrogen and $G_4$ is sulfo, or in which $G_1$ is methoxy, $G_2$, $G_3$ and $G_5$ are each hydrogen and $G_4$ is $\beta$-sulfatoethylsulfonyl, or in which $G_1$, $G_3$ and $G_5$ are each methyl, $G_2$ is hydrogen or —CH(COOH)—N-H—CO—CHBr—CH$_2$Br and $G_4$ is $\alpha,\beta$-dibromopropionylaminomethyl or —CH(COOH)—N-H—CO—CHBr—CH$_2$Br, or in which $G_1$, $G_3$ and $G_5$ are each methyl, $G_2$ is $\alpha,\beta$-dibromopropionylamino and $G_4$ is sulfo, or in which $G_1$ is sulfo, $G_2$, $G_4$ and $G_5$ are each hydrogen and $G_3$ is $\alpha$-dibromoacryloylamino.

2. A continuous process for preparing ozone-fast dyeings on synthetic polyamide fiber material from aqueous liquor with anthraquinone dyes which comprises applying to said fiber material from said liquor at least one anthraquinone dye of the formula

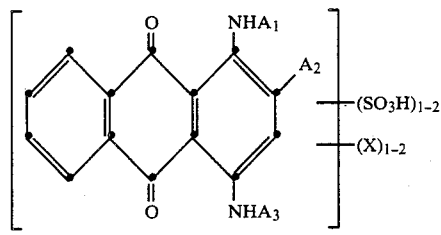

in which $A_1$ is isopropyl, $A_2$ is hydrogen and $A_3X$ is a 4-phenoxyphenyl radical which is substituted in the phenoxy radical by sulfo and acryloylaminomethyl, or in which $A_2$ is hydrogen and each of $A_1X$ and $A_3X$ is a 4-alpha-bromoacryloylamino-3-sulfophenyl radical or a phenyl-sec.-butyl radical which is substituted in the phenyl ring by sulfo and chloroacetylaminomethyl.

3. A process for preparing ozone-fast dyeings on synthetic polyamide fiber material from aqueous liquor with mixtures of two anthraquinone dyes which comprises applying said two dyes to said fiber material from said liquor, each dye independently to the other corresponding to one of the formulae

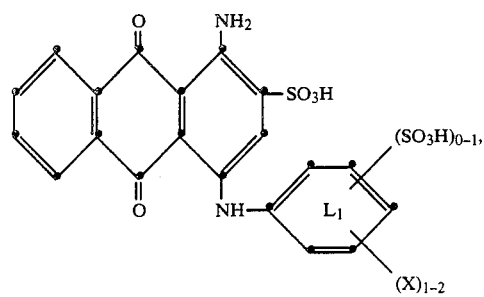

(2)

in which X is a chloroacetyl, bromoacetyl, acryloyl, alpha,beta-dichloro-propionyl, alpha,beta-dibromopropionyl, alpha-bromoacryloyl or alpha-chloroacryloyl radical which is bonded via —NH—,

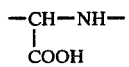

or —CH$_2$—NH—, or is a radical of the formulae

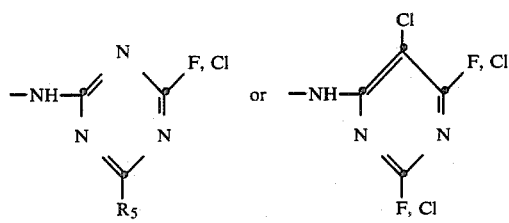

in which R$_5$ is C$_1$–C$_6$-alkoxy, C$_1$–C$_6$-alkylmercapto or a radical of the formula

where R$_6$ and R$_7$, independently of each other, are each hydrogen, C$_1$–C$_6$-alkyl or substituted or unsubstituted phenyl or naphthyl, or is a vinylsulfonyl, β-sulfatoethylsulfonyl, β-acetoxyethylsulfonyl, β-chloroethylsulfonyl or β-(β-sulfatoethylsulfonyl)-propionylaminomethyl radical and the phenyl ring L$_1$ is unsubstituted or monosubstituted, disubstituted, trisubstituted or tetrasubstituted by C$_1$–C$_4$-alkyl, C$_1$–C$_4$-alkoxy or phenoxy, or

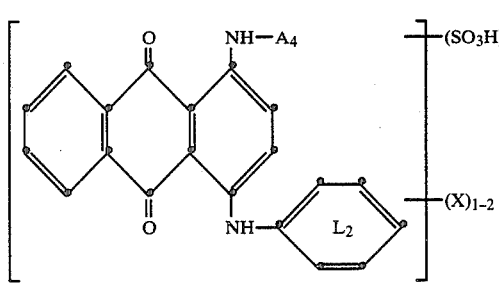

in which A$_4$ is a C$_1$–C$_6$-alkyl or C$_5$–C$_7$-cycloalkyl radical, X is as defined above and the phenyl ring L$_2$ is unsubstituted or monosubstituted, disubstituted or trisubstituted or by C$_1$–C$_4$-alkyl, C$_1$–C$_4$-alkoxy, phenoxy or C$_1$–C$_4$-alkylphenoxy, or

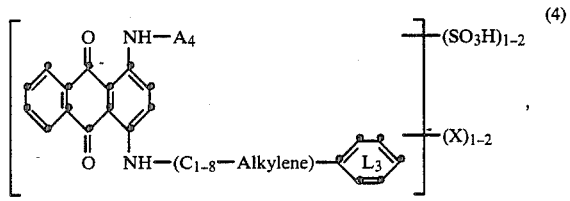

in which A$_4$ is as defined under the formula (3), X is as defined above and the phenyl ring L$_3$ is unsubstituted, or monosubstituted or disubstituted by C$_1$–C$_4$-alkyl or C$_1$–C$_4$-alkoxy, or

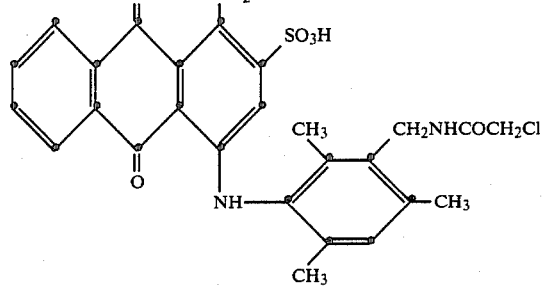

in which X is as defined above.

4. A process according to claim 3, wherein one component corresponds to a dye of the formula (2) and the other component corresponds to a dye of the formula (2) or (3).

5. A process according to claim 3, wherein one component is a dye of the formula

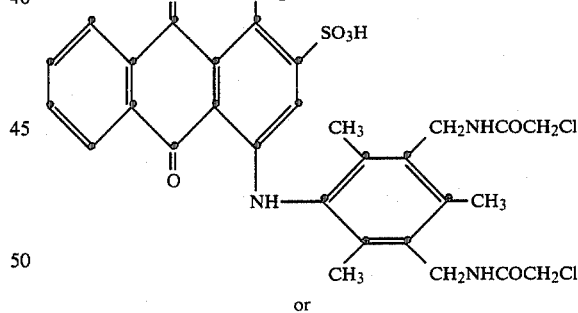

in which A$_4$ is cyclohexyl, L$_2$ is substituted by p-methylphenoxy and X is chloroacetylaminomethyl, and the other component is a dye of the formula

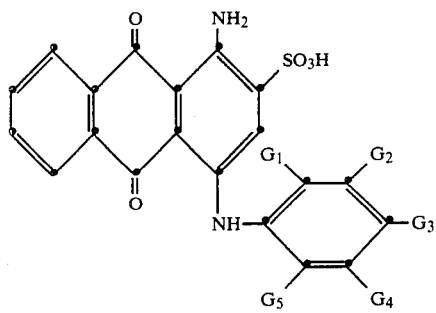

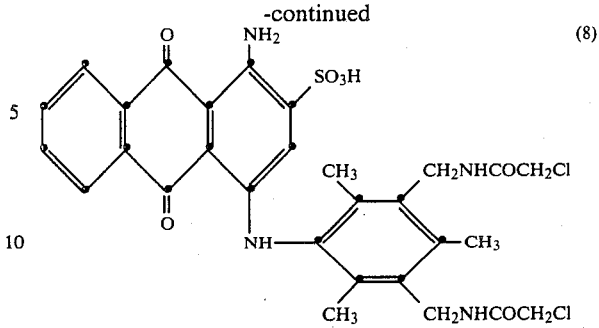

and the other component is a dye of the formula

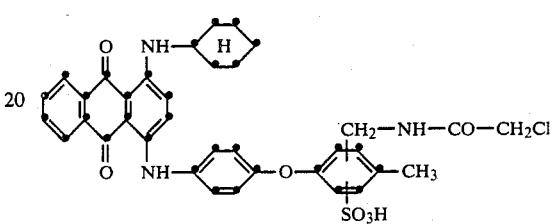

or

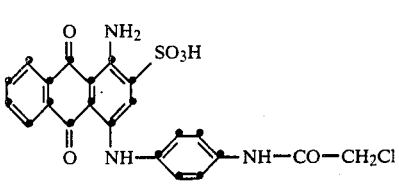

in which $G_1$, $G_2$, $G_4$ and $G_5$ are each hydrogen and $G_3$ is α,β-dibromopropionylamino, or in which $G_1$, $G_3$, $G_4$ and $G_5$ are each hydrogen and $G_2$ is vinylsulfonyl, chloroacetylamino, 2-methoxy-4-fluoro-s-triazinylamino or 2-ethylamino-4-fluoro-s-triazinylamino, or in which $G_1$ is methyl, and $G_2$ is 2,6-difluoro-5-chloropryimidinylamino, $G_3$ and $G_5$ are both hydrogen and $G_4$ is sulfo, or in which $G_1$ is sulfo, $G_2$, $G_4$ and $G_5$ are each hydrogen and $G_3$ is α-bromoacryloylamino, or in which $G_1$, $G_3$ and $G_5$ are each methyl, and $G_2$ is α,β-dibromopropionylaminomethyl, —CH(COOH)—NH—CO—CHBr—CH$_2$Br or α,β-dibromopropionylamino and $G_4$ is hydrogen, —CH(COOH)—NH—CO—CHBr—CH$_2$Br or sulfo, or in which $G_1$ is methoxy, $G_2$, $G_3$ and $G_5$ are each hydrogen and $G_4$ is β-sulfatoethylsulfonyl.

6. A process according to claim 3, wherein one component is a dye of the formula

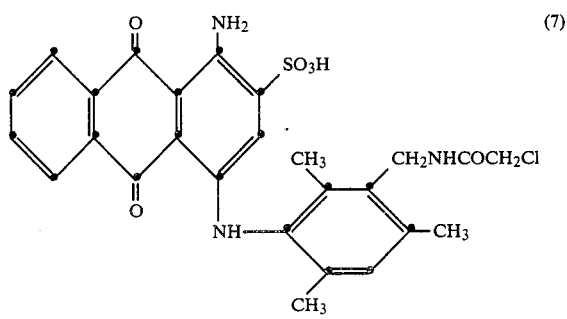

or

7. A process according to claim 6, wherein one component corresponds to the dye of the dye of the formula (7) or (8) and the other component corresponds to the dye of the formula (10).

8. A process according to claim 6, wherein one component corresponds to a dye of the formula (7) or (8) and the other component corresponds to the dye of formula (9).

9. A process according to claim 7, wherein one component corresponds to the dye of the formula (8) and the other component corresponds to the dye of the formula (10).

10. A process according to claim 9, wherein the weight ratio of the dyes of the formulae (8) and (10) is 90:10 to 70:30.

11. A process according to claim 1, wherein nylon 6 is the synthetic polyamide fiber material.

12. A process according to claim 2, wherein nylon 6 is the synthetic polyamide fiber material.

13. A process according to claim 3, wherein nylon 6 is the synthetic polyamide fiber material.

14. A process according to claim 1, wherein heated padded or sprayed-on liquor is applied.

15. A process according to claim 2, wherein heated padded or sprayed-on liquor is applied.

16. A process according to claim 3, wherein heated padded or sprayed-on liquor is applied.

17. A process according to claim 1, wherein polyamide carpets are dyed.

18. A process according to claim 2, wherein polyamide carpets are dyed.

19. A process according to claim 3, wherein polyamide carpets are dyed.

20. A process according to claim 3, wherein the dyeing is continuous.

* * * * *